(12) United States Patent
Gluckstad (10) Patent No.: US 7,697,191 B2
(45) Date of Patent: Apr. 13, 2010

(54) GENERATION OF A DESIRED THREE-DIMENSIONAL ELECTROMAGNETIC FIELD

(75) Inventor: Jesper Gluckstad, Frederiksberg (DK)

(73) Assignee: Danmarks Tekniske Universitet, Lyngby (DK)

( * ) Notice: Subject to any disclaimer, the term of this patent is extended or adjusted under 35 U.S.C. 154(b) by 398 days.

(21) Appl. No.: 10/594,608

(22) PCT Filed: Mar. 31, 2005

(86) PCT No.: PCT/DK2005/000223

§ 371 (c)(1),
(2), (4) Date: Aug. 2, 2007

(87) PCT Pub. No.: WO2005/096115

PCT Pub. Date: Oct. 13, 2005

(65) Prior Publication Data

US 2007/0268545 A1     Nov. 22, 2007

Related U.S. Application Data

(60) Provisional application No. 60/521,873, filed on Jul. 15, 2004, provisional application No. 60/521,318, filed on Mar. 31, 2004.

(51) Int. Cl.
    *G02F 1/01*      (2006.01)
    *G02F 1/00*      (2006.01)
    *G02B 27/46*      (2006.01)

(52) U.S. Cl. ................. 359/279; 359/276; 359/237; 359/559; 359/885; 359/24; 359/29; 382/211; 382/214

(58) Field of Classification Search ............... 359/3, 359/9, 24, 29, 237, 276, 279, 555, 559, 561, 359/562, 885; 355/53, 55, 67, 71; 353/20; 382/210–212, 214, 276, 280, 294; 380/58, 380/59, 205; 398/41; 356/237.1–237.5
See application file for complete search history.

(56) References Cited

U.S. PATENT DOCUMENTS

| | | | | |
|---|---|---|---|---|
| 3,664,248 A * | 5/1972 | Mueller | ................ | 353/20 |
| 4,445,141 A * | 4/1984 | Benton et al. | ............... | 358/481 |
| 4,826,285 A * | 5/1989 | Horner | .................... | 359/561 |
| 5,214,534 A * | 5/1993 | Kallman et al. | ............ | 359/561 |
| 5,426,521 A * | 6/1995 | Chen et al. | .................... | 359/9 |
| 6,011,874 A * | 1/2000 | Gluckstad | ................ | 382/276 |
| 6,021,223 A * | 2/2000 | Toyoda et al. | ............... | 382/214 |
| 6,842,285 B2 * | 1/2005 | Gluckstad | ................ | 359/559 |
| 6,907,124 B1 * | 6/2005 | Gluckstad | ................ | 380/205 |
| 7,411,708 B2 * | 8/2008 | Waldman et al. | ............. | 359/29 |
| 7,492,948 B2 * | 2/2009 | Gluckstad | ................ | 382/211 |

FOREIGN PATENT DOCUMENTS

| | | |
|---|---|---|
| EP | 0 840 159 A2 | 5/1998 |
| EP | 0 840 159 B1 | 1/2005 |
| GB | 2 199 716 A | 7/1988 |
| WO | WO 96/34307 | 10/1996 |
| WO | WO 00/02339 | 1/2000 |
| WO | WO 02/052332 A2 | 7/2002 |

\* cited by examiner

*Primary Examiner*—Loha Ben
(74) *Attorney, Agent, or Firm*—Volentine & Whitt, P.L.L.C.

(57) ABSTRACT

The present invention relates to a method and a system for synthesizing a prescribed three-dimensional electromagnetic field based on generalized phase contrast imaging. Such a method and apparatus may be utilized in advanced optical micro and nano-manipulation, such as by provision of a multiple-beam optical tweezer.

15 Claims, 4 Drawing Sheets

GENERATION OF A DESIRED THREE-DIMENSIONAL ELECTROMAGNETIC FIELD

This application claims the benefit of U.S. Provisional Application No. 60/521,318, filed on Mar. 31, 2004, and of U.S. Provisional Application No. 50/521,873, filed on Jul. 15, 2004.

CROSS REFERENCE TO RELATED APPLICATIONS

This application is the national phase under 35 U.S.C. 371 of PCT International Application No. PCT/DK2005/000223 which has an international filing date of Mar. 31, 2005, and is hereby incorporated by reference in its entirety for all purposes as if fully set forth herein.

FIELD OF THE INVENTION

The present invention relates to a method and a system for synthesizing a prescribed three-dimensional electromagnetic field based on generalized phase contrast imaging.

BACKGROUND OF THE INVENTION

It is well known to form an image by phase contrast imaging methods in which phase modulation of light is converted into intensity modulation. As opposed to intensity modulation, phase modulation does not involve loss of energy.

A generalized phase contrast imaging method and system for synthesizing a prescribed intensity pattern is disclosed in WO 96/34207, which is hereby incorporated by reference. The generalized method is not based on the so-called Zernike approximation that the phase shift $\phi$ is less than 1 radian. An improved method is provided without this approximation and based on imaging with a simple one-to-one mapping of resolution elements or pixels of a spatial phase modulator and resolution elements of the generated intensity pattern.

The disclosed phase contrast imaging method of synthesizing a prescribed intensity pattern $I(x',y')$, comprises the steps of:

dividing the intensity pattern $I(x',y') = |(x',y')|^2$ into pixels in accordance with the disposition of resolution elements (x,y) of a spatial phase mask having a plurality of individual resolution elements (x,y), each resolution element (x,y) modulating the phase of electromagnetic radiation incident upon it with a predetermined phasor value $e^{i\phi(x,y)}$, radiating electromagnetic radiation towards the spatial phase mask, Fourier or Fresnel transforming the modulated electromagnetic radiation, phase shifting with a spatial phase filter (SPF) in a region of spatial frequencies comprising DC in the Fourier or Fresnel plane, the modulated electromagnetic radiation by a predetermined phase shift value $\theta$ in relation to the remaining part of the electromagnetic radiation, and forming the intensity pattern by Fourier or Fresnel transforming, respectively, the phase shifted Fourier or Fresnel transformed modulated electromagnetic radiation, whereby each resolution element (x,y) of the phase mask is imaged on a corresponding resolution element (x',y') of the image, calculating the phasor values $e^{i\phi(x,y)}$ of the phase mask and the phase shift value $\theta$ in accordance with $$o(x',y') = e^{i\phi(x',y')} + \bar{\alpha}(e^{i\theta} - 1)$$

for selected phase shift values $\theta$, $\bar{\alpha}$ being the average of the phasors $e^{i\phi(x,y)}$ of the resolution elements of the phase mask, selecting, for each resolution element, one of two phasor values which represent a particular grey level, and supplying the selected phasor values $e^{i\phi(x,y)}$ to the resolution elements (x,y) of the spatial phase mask.

In one embodiment disclosed in WO 96/34207, the spatial phase mask is positioned at the front focal plane of a lens while the spatial phase filter is positioned in the back focal plane of the lens, whereby a first electromagnetic field at the spatial phase mask is Fourier transformed by the lens into a second electromagnetic field at the spatial phase filter. Thus, specific spatial frequencies of the first electromagnetic field will be transmitted through the spatial phase filter at specific positions of the phase filter. For example, the energy of the electromagnetic radiation at zero frequency (DC) is modified and transformed onto the intersecting point of the Fourier plane and the optical axis of the lens also denoted the zero-order diffraction region by the phase filter.

SUMMARY OF THE INVENTION

The above-mentioned method operates on a plane incoming electromagnetic field with the aim to generate a two-dimensional intensity pattern. It is an object of the present invention to provide a method and a system synthesizing a prescribed three-dimensional electromagnetic field for further flexibility, for example to be able to focus light energy in a three-dimensional volume. Such a method and apparatus may be utilized in advanced optical micro- and nano-manipulation, such as by provision of a multiple-beam optical tweezer.

According to a first aspect of the invention the above-mentioned and other objects are fulfilled by a phase contrast system for synthesizing an output electromagnetic field u(x", y", z"), comprising a first phase modifying element for phase modulation of an input electromagnetic field by phasor values $e^{i\phi(x,y)}$, first Fresnel optics for Fresnel transforming the phase modulated electromagnetic field positioned in the propagation path of the phase modulated field, a spatial filter for filtering the Fresnel transformed electromagnetic radiation by in a region of spatial frequencies comprising DC in the Fresnel plane phase shifting with a predetermined phase shift value $\theta$ the modulated electromagnetic radiation in relation to the remaining part of the electromagnetic radiation, and multiplying the amplitude of the modulated electromagnetic radiation with a constant B, and in a region of remaining spatial frequencies in the Fresnel plane, multiplying the amplitude of the modulated electromagnetic radiation with a constant A, second Fresnel optics for forming an electromagnetic field o(x', y') by Fresnel transforming the phase shifted Fresnel transformed electromagnetic field, and a second phase modifying element for phase modulating the electromagnetic field o(x', y') into the output electromagnetic field $o(x', y')e^{i\psi(x',y')}$ propagating as the desired output electromagnetic field u(x", y", z").

In one embodiment of the invention, a phase contrast system is provided for synthesizing an output electromagnetic field u(x", y", z"), comprising a first phase modifying element for phase modulation of an input electromagnetic field by phasor values $e^{i\phi(x,y)}$, first Fourier optics for Fourier transforming the phase modulated electromagnetic field positioned in the propagation path of the phase modulated field, a spatial filter for filtering the Fourier transformed electromagnetic radiation by in a region of spatial frequencies comprising DC in the Fourier plane phase shifting with a predetermined phase shift value $\theta$ the modulated electromagnetic radiation in relation to the remaining part of the electromagnetic radiation, and multiplying the amplitude of the modulated electromagnetic radiation with a constant B, and in a region of remaining spatial frequencies in the Fourier plane, multiplying the amplitude of the modulated electromagnetic radiation with a constant A, second Fourier optics for forming an electromagnetic field $o(x', y')$ by Fourier transforming the phase shifted Fourier transformed electromagnetic field, and a second phase modifying element for phase modulating the electromagnetic field $o(x', y')$ into the output electromagnetic field $o(x', y')e^{i\psi(x', y')}$ propagating as the desired output electromagnetic field $u(x'', y'', z'')$.

According to a second aspect of the present invention, the above and other objects are fulfilled by a method of synthesizing an output electromagnetic field $u(x'', y'', z'')$, comprising the steps of phase modulating an input electromagnetic field by phasor values $e^{i\phi(x,y)}$, Fresnel transforming the phase modulated electromagnetic field, filtering the Fresnel transformed electromagnetic radiation by in a region of spatial frequencies comprising DC in the Fresnel plane phase shifting with a predetermined phase shift value $\theta$ the modulated electromagnetic radiation in relation to the remaining part of the electromagnetic radiation, and multiplying the amplitude of the modulated electromagnetic radiation with a constant B, and in a region of remaining spatial frequencies in the Fresnel plane, multiplying the amplitude of the modulated electromagnetic radiation with a constant A, forming an electromagnetic field $o(x', y')$ by Fresnel transforming the phase shifted Fresnel transformed electromagnetic field, and phase modulating the electromagnetic field $o(x', y')$ into the output electromagnetic field $o(x', y')e^{i\psi(x', y')}$ propagating as the desired output electromagnetic field $u(x'', y'', z'')$.

In an embodiment of the present invention, a method of synthesizing an output electromagnetic field $u(x'', y'', z'')$ is provided, comprising the steps of phase modulating an input electromagnetic field by phasor values $e^{i\phi(x,y)}$, Fourier transforming the phase modulated electromagnetic field, filtering the Fourier transformed electromagnetic radiation by in a region of spatial frequencies comprising DC in the Fourier plane phase shifting with a predetermined phase shift value $\theta$ the modulated electromagnetic radiation in relation to the remaining part of the electromagnetic radiation, and multiplying the amplitude of the modulated electromagnetic radiation with a constant B, and in a region of remaining spatial frequencies in the Fourier plane, multiplying the amplitude of the modulated electromagnetic radiation with a constant A, forming an electromagnetic field $o(x', y')$ by Fourier transforming the phase shifted Fourier transformed electromagnetic field, and phase modulating the electromagnetic field $o(x', y')$ into the output electromagnetic field $o(x', y')e^{i\psi(x', y')}$ propagating as the desired output electromagnetic field $u(x'', y'', z'')$.

The method may further comprise the steps of dividing the electromagnetic field $o(x',y')$ into pixels in accordance with the disposition of resolution elements $(x, y)$ of a first phase modifying element having a plurality of individual resolution elements $(x, y)$, each resolution element $(x, y)$ modulating the phase of electromagnetic radiation incident upon it with a predetermined phasor value $e^{i\phi(x,y)}$, calculating the phasor values $e^{i\phi(x,y)}$ of the phase modifying element and the phase shift value $\theta$ substantially in accordance with $$o(x',y') \cong A[\exp(i\tilde{\phi}(x',y')) + K|\overline{\alpha}|(BA^{-1}\exp(i\theta)-1)]$$

wherein

A is an optional amplitude modulation of the spatial phase filter outside the zero-order diffraction region, B is an optional amplitude modulation of the spatial phase filter in the zero-order diffraction region, $\overline{\alpha} = |\overline{\alpha}|\exp(i\phi_{\overline{\alpha}})$ is the average of the phasors $e^{i\phi(x,y)}$ of the resolution elements of the phase modifying element, and $\tilde{\phi} = \phi - \phi_{\overline{\alpha}}$, and $K = 1 - J_0(1.22\pi\eta)$, wherein $J_0$ is the zero-order Bessel function, and $\eta$ relates the radius $R_1$ of the zero-order filtering region to the radius $R_2$ of the main-lobe of the Airy function of the input aperture, $\eta = R_1/R_2 = (0.61)^{-1} \Delta r \Delta f_r$, selecting, for each resolution element, one of two phasor values which represent a particular grey level, and supplying the selected phasor values $e^{i\phi(x,y)}$ to the respective resolution elements $(x, y)$ of the first phase modifying element, and supplying selected phasor values $e^{i\psi(x',y')}$ to respective resolution elements $(x', y')$ of a second phase modifying element having a plurality of individual resolution elements $(x', y')$, each resolution element $(x', y')$ modulating the phase of electromagnetic radiation incident upon it with the respective phasor value $e^{i\psi(x',y')}$ for generation of the output field $o(x', y')e^{i\psi(x', y')}$.

The mathematical expressions will be further explained below.

The axis of propagation of a plane electromagnetic field is perpendicular to the electric and magnetic fields.

It should be noted that, in each resolution element of the first phase modifying element, one of two phasor values which represent a particular grey level of the amplitude component of the electromagnetic field $o(x',y')$ may be selected.

In an embodiment of the present invention, the spatial phase filter substantially does not attenuate the electromagnetic fields incident upon it outside the phase shifting regions, i.e. A is equal to one or approximately equal to one.

In an embodiment of the present invention, the spatial phase filter substantially does not attenuate the electromagnetic fields incident upon it inside the phase shifting region, i.e. B is equal to one or approximately equal to one.

It is also preferred that the phase shift value θ substantially fulfils the equation $$K|\bar{\alpha}| = \frac{1}{2\left|\sin\frac{\theta}{2}\right|}$$

for a lossless filter with A=1 and B=1. In a preferred embodiment of the present invention, the phase shift θ is equal to π or approximately equal to π. Accordingly the previous equation leads to $K\bar{\alpha}=½$ and the phase values, φ(x, y), of the first phase modifying element may be calculated in accordance with $$\begin{cases} K\Lambda^{-1}\int\int_\Lambda \cos(\phi(x,y))dxdy = 1/2 \\ K\Lambda^{-1}\int\int_\Lambda \sin(\phi(x,y))dxdy = 0 \end{cases}$$

where Λ is the illuminated area of the first phase modifying element.

The electromagnetic field or radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc. The present invention is also applicable to particle radiation, such as electron radiation, neutron radiation, etc.

Preferably, the electromagnetic fields are monochromatic or quasi-monochromatic so that the energy of the electromagnetic fields is concentrated in a narrow frequency bandwidth. Since the phase contrast generated amplitude pattern is reconstructed by interference of two electromagnetic fields generated by different phase shifting of different parts of the incoming field, it is required that the frequency range of the emitted electromagnetic field is sufficiently narrow to ensure that the two electromagnetic fields are coherent so that their superposition generates the desired amplitude pattern. If the frequency range is too broad, the two fields will be incoherent and the phase information will be lost as superposition of non-coherent fields results in a summation of the intensities of the two fields. It is required that the difference between individual delays of electromagnetic fields to be superpositioned is less than the wavelength of the fields. This is a relaxed requirement that allows the electromagnetic fields to be relatively broad-banded. For example in the visible range, a Xe-lamp or a Hg-lamp can be used as a light source in a system according to the present invention with the advantage compared to a laser light source that speckle noise is reduced. The requirements of the spatial coherence of the electromagnetic fields depend upon the space bandwidth product of the corresponding system and how close the required system performance is to the theoretically obtainable performance of the system.

Preferably, the electromagnetic radiation is generated by a coherent source of electromagnetic radiation, such as a laser, a semi-conductor laser, a strained multi-quantum well laser, a vertical cavity surface emitting laser (VCSEL), a maser, a phase-locked laser diode array, a light emitting diode, a pulsed laser, such as a sub-picosecond laser, etc, or an array of such sources. However, as already mentioned, a high-pressure arc lamp, such as an Hg lamp, a Xe lamp, etc, may also be used and even an incandescent lamp may be used as a source of electromagnetic radiation.

Each phase modifying element changes the phase of an electromagnetic field incident upon it. Optionally, it may also change the amplitude of an electromagnetic field incident upon it. Each phase modifying element may transmit or reflect the incident electromagnetic field. Each phase modifying element may be divided into a number of resolution elements, each of which modulates the incident electromagnetic field by changing its phase by a specific predetermined value. The predetermined values are assigned to each resolution element in different ways depending upon the technology applied in the component. For example in spatial light modulators, each resolution element may be addressed either optically or electrically. The electrical addressing technique resembles the addressing technique of solid-state memories in that each resolution element can be addressed through electronic circuitry to receive a control signal corresponding to the phase change to be generated by the addressed resolution element. The optical addressing technique addresses each resolution element by pointing a light beam on it, the intensity of the light beam corresponding to the phase change to be generated by the resolution element illuminated by the light beam.

Spatial phase modulation may be realized utilizing a fixed phase mask, a liquid crystal device based on liquid crystal display technology, a MEMS (micro electro-mechanical system), a MOEMS (micro opto-electro-mechanical system), such as a dynamic mirror device, a digital micro-mirror array, a deformable mirror device, etc, a membrane spatial light modulator, a laser diode array (integrated light source and phase modulator), smart pixel arrays, etc.

Seiko-Epson produces a transmitting liquid crystal SLM (LC-SLM) having a high resolution matrix of transparent liquid crystal elements wherein the relative permittivity of each element can be electrically modulated in order to vary the refractive index and thereby the optical path length of the element.

Meadowlark produces a parallel-aligned liquid crystal (PAL-SLM) with a high fill factor, but this device has a very low resolution in that it contains only 137 phase-modulating elements.

Hamamatsu Photonics produces a dynamically controllable PAL-SLM with VGA or XGA resolution.

Texas Instruments produces a Digital Mirror Device (DMD) having an array of mirrors each of which can be tilted between two positions.

The spatial phase filter is typically a fixed phase mask, such as an optically flat glass plate coated with a dielectric layer in the region wherein the modulated electromagnetic field is phase shifted θ in relation to the remaining part of the electromagnetic field. However, the spatial phase modulators mentioned in the previous section may also be used for spatial phase filters. In addition, non-linear materials providing self-phase modulation, such as Kerr-type materials, can also be used for introducing the phase shift θ.

An imaging system maps the phase modulating resolution elements of the first phase modifying element onto the second phase modifying element. This imaging system may comprise a 4f-lens configuration (two Fourier transforming lenses utilizing transmission of light or one Fourier transforming lens utilizing reflection of light) or a single imaging lens. However, any optical imaging system providing a filtering plane for the spatial phase filter may be applied in a phase contrast imaging system.

In the method and system according to the present invention, the electromagnetic field o(x', y') is generated by superposition of electromagnetic fields in the image plane of the imaging system. The first phase modifying element changes the phase values of an electromagnetic field incident upon it and the imaging system directs the electromagnetic field with changed phases reflected from or transmitted through the phase modifying element towards the spatial phase filter. The phase filter phase shifts a part of the electromagnetic field and the imaging system is adapted to superimpose in the image plane the phase shifted part of the electromagnetic field with the part of the electromagnetic field that is not phase shifted by the spatial phase filter.

According to a preferred embodiment of the invention, the first phase modifying element is positioned at the front focal plane of a lens while the spatial phase filter is positioned in the back focal plane of the lens, whereby a first electromagnetic field at the phase modifying element is Fourier transformed by the lens into a second electromagnetic field at the phase filter. Thus, specific spatial frequencies of the first electromagnetic field will be transmitted through the spatial phase filter at specific positions of the phase filter. For instance, the energy of the electromagnetic field at zero frequency (DC) is transmitted through the phase filter at the intersecting point of the Fourier plane and the optical axis of the lens also denoted the zero-order diffraction region.

It is an advantage of the invention that utilisation of arrays of sources is facilitated in that the positioning and/or shapes of the phase shifting regions of the phase filter may be matched to the geometry of the source. For example, if a linear array of VCSELs forms the source, the phase shifting regions of the spatial phase filter form a corresponding linear array of phase shifting regions, each of the regions being positioned at the zero-order diffraction region of a respective VCSEL in the VCSEL array. Further, the shape of each phase shifting region may match the shape of the zero-order diffraction region of the respective VCSEL.

Likewise, a phase filter may match a source with a specific geometrical shape with a continuous phase shifting region covering an area of the phase filter that corresponds to the zero-order diffraction region of the source.

Thus, the energy of the electromagnetic fields of the system may be distributed over a large area compared to the area of a zero-order diffraction region of a single plane electromagnetic field of a known phase contrast imaging system.

Thus, the phase shifting regions of the spatial phase filter may form a rectangular array, a circular array, a linear array, two linear crossing arrays, a continuous region, a ring, etc.

At least two substantially plane electromagnetic fields with different axes of propagation may be generated in a time multiplexed manner, e.g. by a scanning mirror or prism, deflecting or reflecting a beam of electromagnetic field in different directions of propagation.

The capability of handling high energy levels of electromagnetic fields of the present invention may be utilized for provision of a 3D laser cutter comprising a system according to the present invention.

Further, the capability of handling high energy levels in combination with the capability of generating a desired three-dimensional field comprising desired light beams may be utilized for provision of an optical tweezer or an array of optical tweezers according to the present invention.

In an embodiment of the present invention, wherein the apertures of the system is of insignificant importance to the operation of the system and calculation of the phasor values, K is equal to one or approximately equal to one.

For a more detailed understanding of the invention, the Zernike approximation is reviewed below, followed by a generalization where the above-mentioned mathematical expressions are derived for an on-axis centred phase contrast filtering implementation.

The Zernike phase contrast method allows for the visualization of phase perturbations by the use of a Fourier plane phase shifting filter. The Dutch physicist Fritz Zernike received the Nobel Prize in 1953 for inventing this method, which led to a break-through in medicine and biology by making essentially transparent cell or bacteria samples clearly visible under a microscope. Its successful operation, however, requires that the spatial phase distribution, $\phi(x, y)$, at the input is limited to a "small-scale" phase approximation where the largest phase is typically taken to be significantly less than $\pi/3$. According to this assumption, a Taylor expansion to first order is sufficient for the mathematical treatment so that the input wavefront can be written as $$\exp(i\phi(x,y)) \approx 1 + i\phi(x,y) \tag{1}$$

The light corresponding to the two terms in this "small-scale" phase approximation can be separated spatially by use of a single lens where the phase distribution is located in the front focal plane and the corresponding spatial Fourier transformation is generated in the back focal plane of the lens. In this first order approximation the constant term represents the amplitude of on-axis light focused by the lens in the back focal plane and the second spatially varying term represents the off-axis light.

Zernike realized that a small phase shifting quarter wave plate acting on the focused light makes it possible to obtain an approximately linear visualization of small phase structures by generating interference between the two-phase quadrature terms in Eq. (1):

$$I(x',y') \approx 1 + 2\phi(x',y') \tag{2}$$

It should be noted that a three-quarter waveplate works equally well to produce contrast, but the plus sign in Eq. (2) is negated leading to so-called negative phase contrast. A substantial improvement in the visibility of the Zernike phase contrast visualization in Eq. (2) requires strong damping of the focused light in addition to the phase shift required to generate the contrast.

In the general case, where we are not limited to a small-scale input phase perturbation we cannot assume that a series expansion to first order as in the Zernike approximation is a sufficient representation of a given phase perturbation. Higher order terms in the expansion need to be taken into account, so the expansion takes the form:

$$\exp(i\phi(x, y)) = 1 + i\phi(x, y) - \frac{1}{2}\phi^2(x, y) - \frac{1}{6}i\phi^3(x, y) + \frac{1}{24}\phi^4(x, y) + \ldots \tag{3}$$

However, here the spatially varying terms can not be considered as separate from the supposedly focused light represented by the first term in this Taylor series expansion, as is implied by the Zernike approach, and all of these spatially varying terms contribute to the intensity of the on-axis focused light. For a significant modulation in the input phase, this contribution of the spatially varying terms can result in a significant modulation of the focal spot amplitude in the back focal plane of the lens. These terms can in fact result in either constructive or destructive interference with the on-axis light, although the net result will be an attenuation of the focused light amplitude, which only has a maximum value for a perfect unperturbed plane wave at the input.

For phase objects not fulfilling the Zernike approximation we must, therefore, find an alternative mathematical approach to that of the Taylor expansion given in Eq. (3). We have chosen a Fourier analysis as a more suitable technique for completely separating the on-axis and higher spatial frequency components. This gives the following form for $\exp(i\phi(x,y))$, where $(x,y) \in \Omega$:

$$\exp(i\phi(x,y)) = \left(\iint_\Omega dxdy\right)^{-1} \iint_\Omega \exp(i\phi(x,y))dxdy + \qquad (4)$$

"higher frequency terms"

In this Fourier decomposition the first term is a complex valued constant linked to the on-axis focused light from a phase object defined within the spatial region, $\Omega$, and the second term describes light scattered by spatially varying structures in the phase object. Comparing Eq. (3) and Eq. (4) it is apparent that the first term of Eq. (3) is a poor approximation to the first term of Eq. (4) when operating beyond the Zernike small-scale phase regime.

An important issue to consider when analysing the effect of spatial filtering of the light diffracted by phase perturbations is the definition of what spatially constitutes focused and scattered light. In the previous description of Zernike phase contrast it was assumed that the focused light is spatially confined to a somewhat unphysical delta function. As we know, any aperture truncation inherent in any practical optical system will lead to a corresponding spatial broadening of the focused light. It is therefore essential that we define the terms "focused light" and "scattered light" explicitly for such a system. In this context it is necessary to look more carefully at the sequence of apertures confining the light wave propagation through a typical optical set-up.

Figure 1:
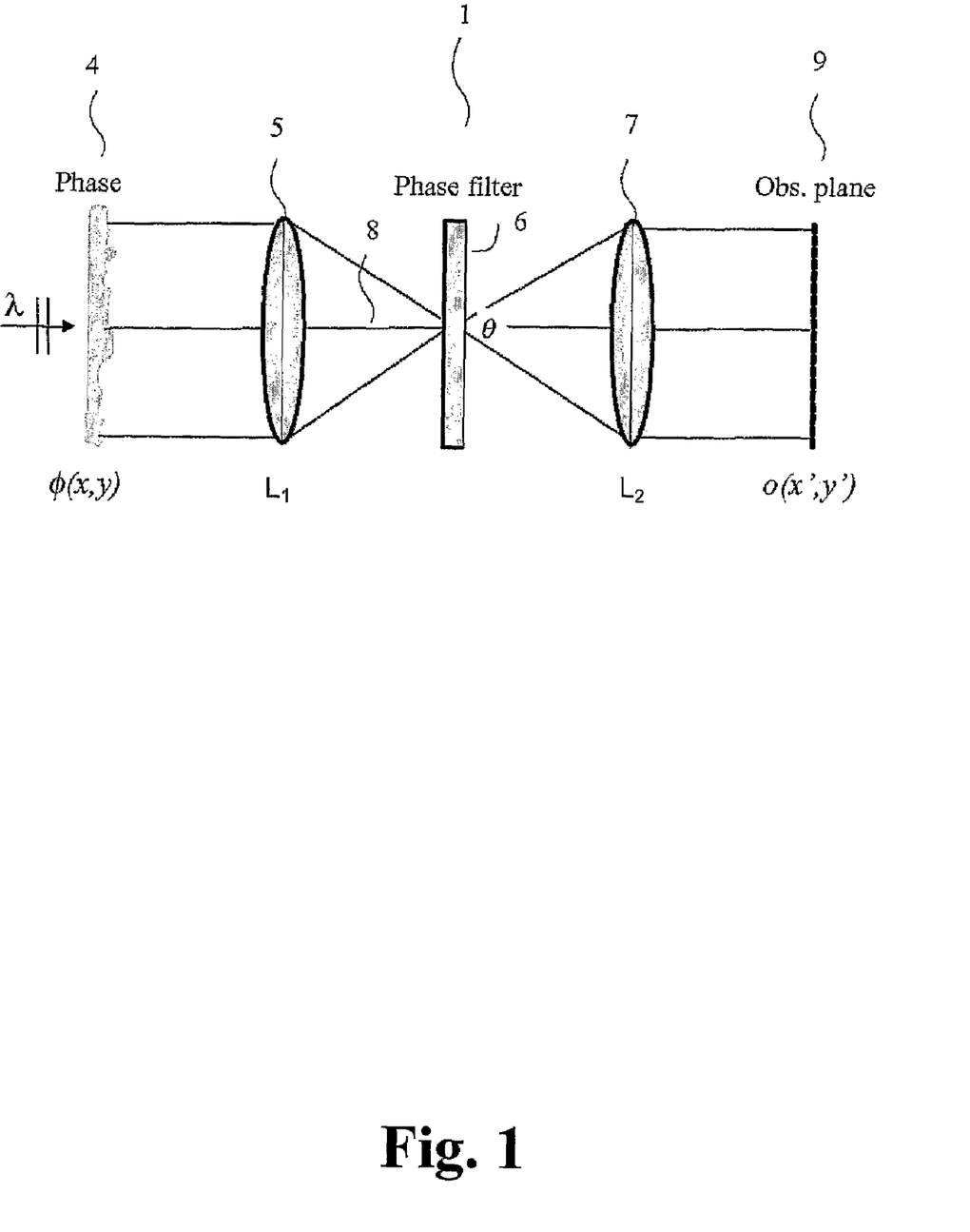
FIG. 1 illustrates schematically a known 4f phase contrast imaging system.

A commonly applied architecture that provides an efficient platform for spatial filtering is illustrated in FIG. 1 and is based on the so-called 4-f configuration. An output interferogram of an unknown phase object or phase disturbance is obtained by applying a truncated on-axis filtering operation in the spatial frequency domain between two Fourier transforming lenses (L1 and L2). The first lens performs a spatial Fourier transform so that directly propagated light is focused into the on-axis filtering region whereas spatially varying object information generates light scattered to locations outside this central region. We can describe a general Fourier filter in which different phase shifts and amplitude damping factors are applied to the "focused" and "scattered" light. In FIG. 1, we show a circularly symmetric Fourier filter described by the amplitude transmission factors A and B for the "scattered" and "focused" light respectively and by the relative phase shift $\theta$. These filter parameters can be chosen to replicate any one of a large number of commonly used filter types (i.e. phase contrast, dark central ground, point diffraction and field-absorption filtering). By applying a given Fourier filter and a second Fourier lens, we obtain an interference pattern in the observation plane. The focused on-axis light acts as the synthetic reference wave (SRW) in the common path interferometer (CPI) system, this interferes with the scattered light to generate the output interference pattern. In the following section we discuss the importance of the SRW and show how it influences, among other things, the choice of the Fourier filter parameters.

Having described the generic optical system that makes up the CPI, we turn to a detailed analytical treatment of the important elements in this system. Assuming a circular input aperture with radius, $\Delta r$, truncating the phase disturbance modulated onto a collimated, unit amplitude, monochromatic field of wavelength, $\lambda$, we can describe the incoming light amplitude $a(x,y)$ by, $$a(x,y) = circ(r/\Delta r)\exp(i\phi(x,y)) \qquad (5)$$

at the entrance plane of the optical system shown in FIG. 1 using the definition that the circ-function is unity within the region, $r = \sqrt{x^2+y^2} \leq \Delta r$, and zero elsewhere. Similarly, we assume a circular on-axis centred spatial filter of the form:

$$H(f_x, f_y) = A[1 + (BA^{-1}\exp(i\theta) - 1)circ(f_r/\Delta f_r)] \qquad (6)$$

where $B \in [0; 1]$ is the chosen filter transmittance of the focused light, $\theta \in [0; 2\pi]$ is the applied phase shift to the focused light and $A \in [0; 1]$ is a filter parameter describing field transmittance for off-axis scattered light as indicated in FIG. 1. The spatial frequency coordinates are related to spatial coordinates in the filter plane such that: $(f_x, f_y) = (\lambda f)^{-1}(x_f, y_f)$ and $f_r = \sqrt{f_x^2 + f_y^2}$.

Performing an optical Fourier transform of the input field from Eq. (5) followed by a multiplication with the filter parameters in Eq. (6) and a second optical Fourier transform (corresponding to an inverse Fourier transform with inverted coordinates) we obtain an expression for the intensity $I(x', y') = |o(x', y')|^2$ describing the interferogram at the observation plane of the 4-f set-up:

$$I(x',y') = |A^2|\exp(i\tilde{\phi}(x',y'))circ(r'/\Delta r) + \bar{\alpha}|(BA^{-1}\exp(i\theta)-1)g(r')|^2 \qquad (7)$$

where $g(r')$ is the synthetic reference wave (SRW) and the terms $\bar{\alpha}$ and $\tilde{\phi}(x', y')$ are given by:

$$\begin{cases} \bar{\alpha} = (\pi(\Delta r)^2)^{-1} \iint\limits_{\sqrt{x^2+y^2} \leq \Delta r} \exp(i\phi(x,y))dxdy = |\bar{\alpha}|\exp(i\phi_{\bar{\alpha}}) \\ \tilde{\phi}(x',y') = \phi(x',y') - \phi_{\bar{\alpha}} \end{cases} \qquad (8)$$

It should be noted that to achieve a tractable analytic expression in Eq. (7) it has been assumed that the spatial frequency content of the phase object is sufficiently described by the term, $\bar{\alpha}$, within the on-axis centred filtering region characterized by the spatial frequency range $\Delta f_r$.

The generally complex valued and object dependent term, $\bar{\alpha}$, corresponding to the amplitude of the focused light plays a significant role in the expression for the interference pattern described by Eq. (7). Referring to the discussion in the introduction, we are now able to confirm that the frequent assumption, that the amplitude of the focused light is approximately equal to the first term of the Taylor expansion in Eq. (1), can generally result in misleading interpretations of the interferograms generated at the CPI output.

Of similar importance in the analysis of Eq. (7) is the term $g(r')$ describing the spatial profile of the SRW, diffracted from the aperture formed by the on-axis centred filtering region. It is the interference between this SRW term, carrying the information about the filtering parameters, and the imaged phase object that generates the output interferogram. Thus, it is important to obtain an accurate description for the SRW and thereby an accurate derivation for Eq. (7). The zero-order Hankel transform followed by a series expansion in the spatial dimension, r', will be used to describe the SRW. This is a relatively simple approach, which to the knowledge of the author has not previously been applied to this problem.

For a circular input aperture with radius, $\Delta r$, we can describe the radius of the corresponding central phase shifting region of the Fourier filter (characterized by the parameters B and $\theta$) in terms of a radial spatial frequency range $\Delta f_r$. We can thus obtain the following expression for the SRW by use of the zero-order Hankel transform:

$$g(r') = 2\pi\Delta r \int_0^{\Delta f_r} J_1(2\pi\Delta r f_r) J_0(2\pi r' f_r) df_r \qquad (9)$$

In order to simplify the analysis, we introduce a term $\eta$, which explicitly relates the radius of the central filtering region, $R_1$, to the radius of the main-lobe of the Airy function, $R_2$, resulting from the Fourier transform of the circular input aperture alone. We can thus express $\eta$ in terms of $\Delta r$ and $\Delta f_r$ such that:

$$\eta = R_1/R_2 = (0.61)^{-1}\Delta r \Delta f_r \qquad (10)$$

where the factor of 0.61 arises from the radial distance to the first zero crossing of the Airy function corresponding to half of the Airy mainlobe factor, of 1.22. If we make this substitution in Eq. (9) and then perform a series expansion in r', we obtain the following expression for the SRW:

$$g(r') = 1 - J_0(1.22\pi\eta) - [(0.61\pi\eta)^2 J_2(1.22\pi\eta)](r'/\Delta r)^2 + \{[(0.61)^3/4][2J_3(1.22\pi\eta) - 0.61\pi\eta J_4(1.22\pi\eta)]\}(r'/\Delta r)^4 \qquad (11)$$

In this expansion, the SRW is expressed in radial coordinates normalised to the radius of the imaged input aperture. This can easily be scaled to allow for a magnification within the imaging system, though for the remainder of our analysis a direct imaging operation is assumed. From Eq. (11) it is apparent that the SRW will change as a function of the radius of the central filtering region. Additionally, it is clear that the SRW profile is not necessarily flat over the system output aperture. This is an important, yet often neglected, factor in determining the performance of a CPI.

Depending on the accuracy needed for the description of the interferograms one can choose to include a number of spatial higher order terms from the expansion in Eq. (11). The influence of the higher order terms has the largest impact along the boundaries of the imaged aperture. For $\eta$-values smaller than 0.627 and when operating within the central region of the image plane, spatial higher order terms are of much less significance and we can safely approximate the synthetic reference wave with the first and space invariant term in Eq. (11):

$$g(r' \in \text{central region}) \approx 1 - J_0(1.22\pi\eta) \qquad (12)$$

so that we can simplify Eq. (7) to give:

$$I(x',y') \approx A^2 |\exp(i\tilde{\phi}(x',y')) + K|\overline{\alpha}|(BA^{-1}\exp(i\theta) - 1)|^2 \qquad (13)$$

where $K = 1 - J_0(1.22\pi\eta)$. The influence of the finite on-axis filtering radius on the focused light is thus effectively included as an extra "filtering parameter" so that the four-parameter filter set $(A, B, \theta, K(\eta))$ together with the complex object dependent term, $\overline{\alpha}$, effectively defines the type of filtering scheme we are applying.

Having determined a suitable operating range for the CPI in terms of the production of a good SRW, we must now examine the role that the remaining filter parameters play in the optimisation of a CPI.

From Eq. (13) we see that the filter parameters $(A, B, \theta)$ can be combined to form a single complex valued term, C, the combined filter term, such that:

$$C = |C|\exp(i\psi_C) = BA^{-1}\exp(i\theta) - 1 \qquad (14)$$

therefore, Eq. (13) can be simplified to give:

$$I(x',y') = A^2 |\exp(i\tilde{\phi}(x',y') - i\psi_C) + K|\overline{\alpha}||C||^2 \qquad (15)$$

where $$\begin{cases} BA^{-1} = \sqrt{1 + 2|C|\cos(\psi_C) + |C|^2} \\ \sin\theta = (BA^{-1})^{-1}|C|\sin(\psi_C) \end{cases} \qquad (16)$$

Since it is a complex variable, the combined filter term C, which effectively describes the complex filter space, can be considered to consist of a vector of phase $\psi_C$ and length $|C|$ as shown in Eq. (14). Thus in order to obtain an overview of the operating space covered by all the possible combinations of three independent filter parameters $(A, B, \theta)$ we can now instead choose to consider a given filter in terms of the two combined parameters $\psi_C$ and $|C|$. However, referring to Eq. (15), it can be seen that the filter parameter, A, also appears independently of the combined filter term, C. Fortunately, this issue can be resolved by considering that the term $BA^{-1}$ from Eq. (14) must be constrained in the following way:

$$\begin{cases} BA^{-1} < 1 \Rightarrow A = 1 \quad B = |C+1| \\ BA^{-1} = 1 \Rightarrow A = 1, \quad B = 1 \\ BA^{-1} > 1 \Rightarrow B = 1, \quad A = |C+1|^{-1} \end{cases} \qquad (17)$$

These constraints arise from the adoption of a maximum irradiance criterion minimising unnecessary absorption of light in the Fourier filter, which reduces both irradiance and the signal to noise ratio in the CPI output.

In the previous sections we derived expressions relating the spatial average value of a given phase disturbance to obtain peak irradiance and optimal visibility in combination with high accuracy in systems with unknown wavefront phase disturbances. We saw that if a CPI is applied to wavefront sensing or the visualisation of unknown phase objects the Generalised Phase Contrast (GPC) method specifies the filter phase and aperture size parameters for achieving optimal performance in extracting and displaying the phase information carried by the incoming wavefront. On the other hand, in cases where we have control over the incoming wavefront or phase modulation the GPC method provides extra means of optimisation by encoding the phase distribution itself in addition to modifying the filter parameters. The two main scenarios: A) synthesizing the spatial phase for intensity display or B) measuring the spatial phase with high accuracy, strongly influences which of the parameters in the analysis that should be kept fixed and which could be changed or adapted. The first approach is particularly useful when the filter parameters have a restricted dynamic range or are fixed. The rigorous derivation of the equations for choosing these parameters will be derived in this section.

When synthesizing an input phase distribution for optimal visibility of an output intensity pattern the situation is more relaxed than the situation involving accurate interferometric measurements of unknown phase disturbances. The parameter $\eta$ can therefore in most cases be chosen to completely encompass the zero-order light with the result that the term, K, tends to unity as the Bessel function tends to zero in Eq. (12). For this particular case, the SRW becomes a flat top profile where we can achieve nearly 100% light efficiency. For smaller and irregular phase patterns fine-tuning of $\eta$ in the region 0.4-0.6 provides for an efficient operating regime while maintaining minimal losses.

In order to optimize a synthesized light distribution for maximum contrast, we wish to generate an intensity distribution with a lowest intensity equal to zero, i.e. in at least one point $(x'_0, y'_0)$:

$$I(x'_0, y'_0; \tilde{\phi}_0) = 0 \quad (20)$$

where $\tilde{\phi}_0$ is the relative phase shift generating zero-intensity in $(x'_0, y'_0)$ of the observation plane.

Applying this dark background condition in Eq. (13) we can obtain the following expression for a no-loss phase-only filter with filter transmission parameters, A=B=1:

$$K|\bar{\alpha}|(1-\exp(i\theta)) = \exp(i\tilde{\phi}_0) \quad (21)$$

A key point arising from Eq. (21) is that we now have a simple way of expressing a new design criterion relating the spatial average value of any input phase pattern to the zero-order phase shift of a matched Fourier phase filter. Since K is by definition positive and by taking the modulus of Eq. (21) we obtain:

$$K|\bar{\alpha}| = |2\sin(\theta/2)|^{-1} \quad (22)$$

Eq. (22) is a key result for the fully transmissive wavefront engineered GPC mapping that makes it possible to deduce the range of valid phase parameters fulfilling our design criteria from Eq. (20). The largest possible value that the term, $K|\bar{\alpha}|$, takes on is unity, this leads to the following solution interval for Eq. (22) within a full phase-cycle:

$$\theta = [\pi/3; 5\pi/3] \quad (23)$$

From Eq. (22) we also observe that $K|\bar{\alpha}|$ can take on a value limited to the interval:

$$K|\bar{\alpha}| = [\tfrac{1}{2}; 1] \quad (24)$$

Eq. (22) and the solution intervals described by Eqs. (23)-(24) specify the design parameters for achieving optimal performance in extracting and displaying the phase information carried by the incoming wavefront. Moreover, Eq. (22) hints towards extra means of optimisation by encoding the phase modulation depth itself in addition to the no-loss phase-only filter. This last approach is particularly useful when the filter phase has a restricted dynamic range or is fixed.

Now, assuming that we have a fixed and fully transmissive phase-only filter, the best choice for the filter parameter is a value that allows for the largest dynamic range of phasor values at the input. Accordingly, the smallest possible real value, $K\bar{\alpha} = \tfrac{1}{2}$, is desirable implying that $\theta = \pi$, leading to the output intensity distribution:

$$I(x', y') = 2[1 - \cos(\phi(x', y'))] \quad (25)$$

Inserting $K\bar{\alpha} = \tfrac{1}{2}$ in Eq. (8) we obtain the following two requirements for the input encoded phase function $\phi(x,y)$:

$$\begin{cases} K\Lambda^{-1} \int\int_\Lambda \cos(\phi(x,y)) dx\, dy = 1/2 \\ K\Lambda^{-1} \int\int_\Lambda \sin(\phi(x,y)) dx\, dy = 0 \end{cases} \quad (26)$$

where $\Lambda$ is the illuminated area of the phase modifying element.

We observe that it is only the first requirement in Eq. (26) that is directly related to the output intensity in Eq. (25) via the cosine term. Since there are always two choices for a given phasor value that result in the same cosine value (excluding 0 and $\pi$), we notice that the second requirement can subsequently be fulfilled independently of the first requirement simply by complex conjugating an appropriate number of phasor values. This fact is a key feature of the GPC-method since it makes it possible to solely concentrate on the first requirement in the process of synthesizing a desired an virtually no-loss grey level intensity pattern.

The first requirement in Eq. (26) can be fulfilled by several means, including: dynamic phase range adjustment, fill factor encoding, phase-histogram adjustment, spatial scaling of phasor pattern, raster encoding etc. In a histogram adjustment technique one will typically start out with a desired relative intensity distribution $I(z', y')_{desired}$ where the maximum achievable intensity level is unknown but relative intensity levels are known and the lowest intensity level is fixed by the background criterion of Eq. (20). The procedure is now to adjust the histogram for $I(x', y')_{desired}$ while maintaining identical relative intensity level ratios until the first requirement in Eq. (26) is fulfilled. Subsequently, the second requirement in Eq. (26) is fulfilled by complex conjugating an appropriate part of the phasors. The simplest procedure is to complex conjugate every second identical phasor value independently of the spatial location. However, this "phasor flipping" procedure can also be turned into an advantageous tool (an extra degree of freedom) for manipulating the spatial frequency content in order to optimize the separation of low and high spatial frequency terms at the Fourier filter plane by taking the spatial phasor location into account. E.g. neighbouring phasor values can be chosen to have a maximum difference between them, thereby introducing high spatial frequency modulation easing the filtering in the spatial Fourier domain.

In most cases, however, equalized output intensity levels are sufficient. In the succeeding analysis, we therefore focus on the encoding of the input phase levels to achieve binary output intensity levels. A derivation based on ternary phase levels allows for the widest range of binary intensity pattern encoding and automatically provides for the simplified but important binary phase level encoding as a special case.

For the ternary phase encoding, we consider the illuminated portion of the input aperture area, $\Lambda$, as divided into sub-areas $\Lambda_0$, $\Lambda_1$ and $\Lambda_2$ with respective phase values $\phi_0$, $\phi_1$ and $\phi_2$. We are aiming for the derivation of general expressions relating the addressing parameters for the phase modulation to the range of possible phase parameters of the Fourier filter obeying the design criterion we have already set out. We can express the total truncated area and its average phase modulation, as the sum of the phase-weighted sub-areas:

$$\Lambda_0 \exp(i\tilde{\phi}_0) + \Lambda_1 \exp(i\tilde{\phi}_1) + \Lambda_2 \exp(i\tilde{\phi}_2) = \Lambda|\bar{\alpha}| \quad (27)$$

This can be further simplified by expressing the sub-areas as fractions of the total area, $\Lambda$, such that $F_1 = \Lambda_1/\Lambda$ and $F_2 = \Lambda_2/\Lambda$:

$$(1 - F_1 - F_2)\exp(i\tilde{\phi}_0) + F_1 \exp(i\tilde{\phi}_1) + F_2 \exp(i\tilde{\phi}_2) = |\bar{\alpha}| \quad (28)$$

As previously mentioned we are interested in binary intensity patterns with levels corresponding to the input phase values. In this case the dark background region is defined by $(\Lambda_0, \tilde{\phi}_0)$ and the bright output level of intensity, I, is determined by $(\Lambda_1, \tilde{\phi}_1)$ and $(\Lambda_2, \tilde{\phi}_2)$ at the input plane. For the binary output intensity condition it follows that:

$$I(\tilde{\phi}_1) = I(\tilde{\phi}_2) \quad (29)$$

This equality corresponds to a symmetric condition that can be easily verified applying the phasor chart analysis tech nique demonstrated in section 4. Due to this symmetry we can simplify the analysis by applying the following substitution:

$$\Delta\phi = \tilde{\phi}_1 - \tilde{\phi}_0 = \tilde{\phi}_0 - \tilde{\phi}_2 \qquad (30)$$

so that Eq. (28) can be rewritten as:

$$F_1(\exp(i\Delta\phi)-1) + F_2(\exp(-i\Delta\phi)-1) = K^{-1}(1-\exp(i\theta))^{-1} - 1 \qquad (31)$$

It is now a straightforward task to solve Eq. (31) for the real part and the imaginary part respectively, to obtain the following set of equations:

$$\begin{cases} F_1 + F_2 = (2K-1)(2K(1-\cos(\Delta\phi)))^{-1} \\ F_1 - F_2 = \sin(\theta)(2K\sin(\Delta\phi)(1-\cos(\theta)))^{-1} \end{cases} \qquad (32)$$

This can also be expressed in terms of the fractional areas, such that:

$$\begin{cases} F_1 = (4K)^{-1}[(2K-1)(1-\cos(\Delta\phi))^{-1} + \sin(\theta)(\sin(\Delta\phi)(1-\cos(\theta)))^{-1}] \\ F_2 = (4K)^{-1}[(2K-1)(1-\cos(\Delta\phi))^{-1} - \sin(\theta)(\sin(\Delta\phi)(1-\cos(\theta)))^{-1}] \end{cases} \qquad (33)$$

Since we have focused on solutions where identical intensity levels are obtained in both the $F_1$-region and the $F_2$-region we can define the resulting illumination compression factor, C, in the following way:

$$C = (F_1 + F_2)^{-1} = (1-(2K)^{-1})^{-1}(1-\cos(\Delta\phi)) \qquad (34)$$

The minimum compression factor corresponds to uniform illumination at the output such that $F_1 + F_2 = 1$, whereas the maximum compression factor is found to be $C \to \infty$ for $K = \frac{1}{2}$.

An interesting special case can be deduced from Eq. (31) by setting $F_2 = 0$, where we find that:

$$F = F_1 = (K(1-\exp(i\theta))-1)(K(1-\exp(i\Delta\phi))(1-\exp(i\theta)))^{-1} \qquad (35)$$

implying that for the binary phase modulation case we must have:

$$\Delta\phi = \theta \qquad (36)$$

in order for the fill factor, F, to be real-valued.

This result turns out to be the special case that corresponds to the set of solutions where a binary phase pattern serves as the input.

The second phase modifying element imposes a spatial phase shift, $\psi(x',y')$, on the phase contrast generated electromagnetic field $o(x', y')$. This superposition generates an arbitrary controllable complex field, $o(x', y')e^{i\psi(x',y')}$ with amplitude given by the square-rooted intensity, $|o(x', y')| = \sqrt{I(x',y')}$, and phasor given by the remaining part under division with the amplitude term, $o(x', y')e^{i\psi(x',y')}/|o(x', y')|$. The resulting arbitrary controllable complex field, $o(x', y')e^{i\psi(x',y')}$ is capable of re-distributing the light into an arbitrary three-dimensional focusing within a selected volume of operation. This focusing within a volume is a result of complex wave propagation and can be deduced by use of Maxwell's equations. A simplified scalar description of this complex wave propagation into a 3D field distribution can be obtained by use of a simple plane wave Fourier decomposition:

$$u(x'',y'',z'') = \iint \Im(o(x',y')e^{i\psi(x',y')}) e^{-i2\pi(f_x x'' + f_y x'')} e^{-i2\pi(\lambda^{-2} - f_x^2 - f_y^2)z''} df_x df_y \qquad (37)$$

operating on the Fourier transform, $\Im$, of the controllable complex electromagnetic field leaving the second phase modifying element. Any subsequent focusing optics can be included in the Fourier decomposition of Eq. (37).

At least one of the first and second phase modifying elements may further be adapted for phase modulation by first phasor values for a first polarization and second phasor values for a second orthogonal polarization of the input electromagnetic field. Individual phase modulation of orthogonal polarizations of an electromagnetic field may for example be performed by a birefringent spatial light modulator, such as a spatial light modulator based on liquid crystal technology.

This allows for an extended functionality where the generated 3D field distribution can be divided into two orthogonal and non-interfering polarisation components that can e.g. be applied in a counter-propagating geometry.

Preferably, the second phase modifying element is adapted for phase modulation by first phasor values $e^{i\psi_1(x',y')}$ for a first polarization and second phasor values $e^{i\psi_2(x',y')}$ for a second orthogonal polarization of the input electromagnetic field.

DETAILED DESCRIPTION OF PREFERRED EMBODIMENTS

FIG. 1 shows a known 4f CPI phase contrast imaging system 1. A laser (not shown) emits a light beam, which is expanded by a beam expander (not shown) into a plane light wave of uniform intensity and directs it towards a first phase modifying element 4. The light beam is transmitted through the first phase modifying element 4 and a Fourier transforming lens L1. The first phase modifying element 4 is positioned in the front focal plane of the lens L1 and a spatial phase filter 6 is positioned in the back focal plane of the lens L1 that is also the front focal plane of a lens L2. The Fourier transforming lenses L1, L2 need not have identical focal lengths. Different focal lengths lead to a magnification ratio different from one. The spatial phase filter 6 phase shifts by θ, and optionally attenuates (by a factor B), the zero order diffraction part 8 of the light phase modulated by the first phase modifying element. Optionally, the remaining diffraction part of the light modulated by the phase modifying element may be attenuated by a factor A. The electromagnetic field $o(x', y')$ is generated in the back focal plane 9 of the lens L2.

Figure 2:
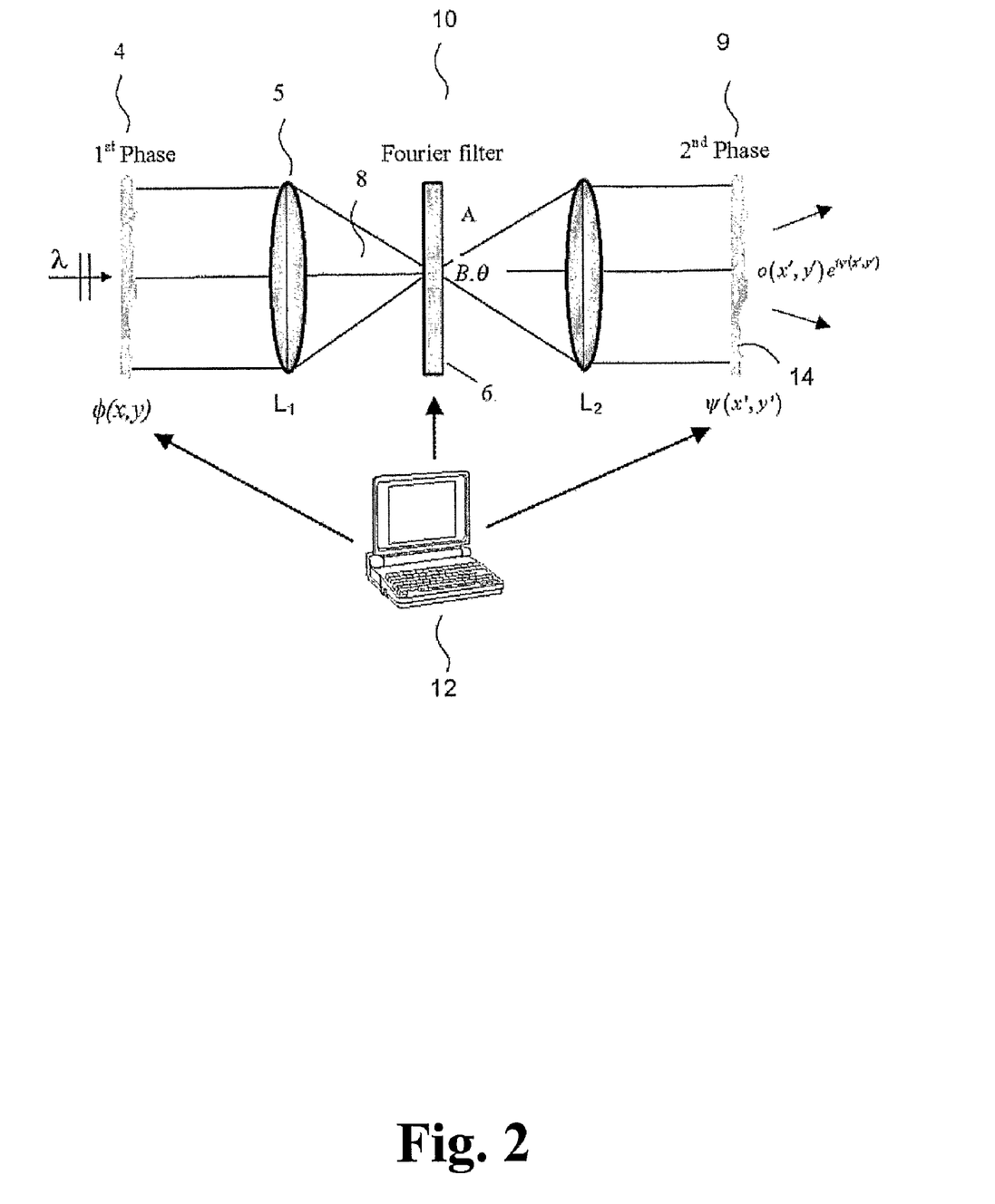
FIG. 2 illustrates schematically an embodiment of the present invention.
Figure 3:
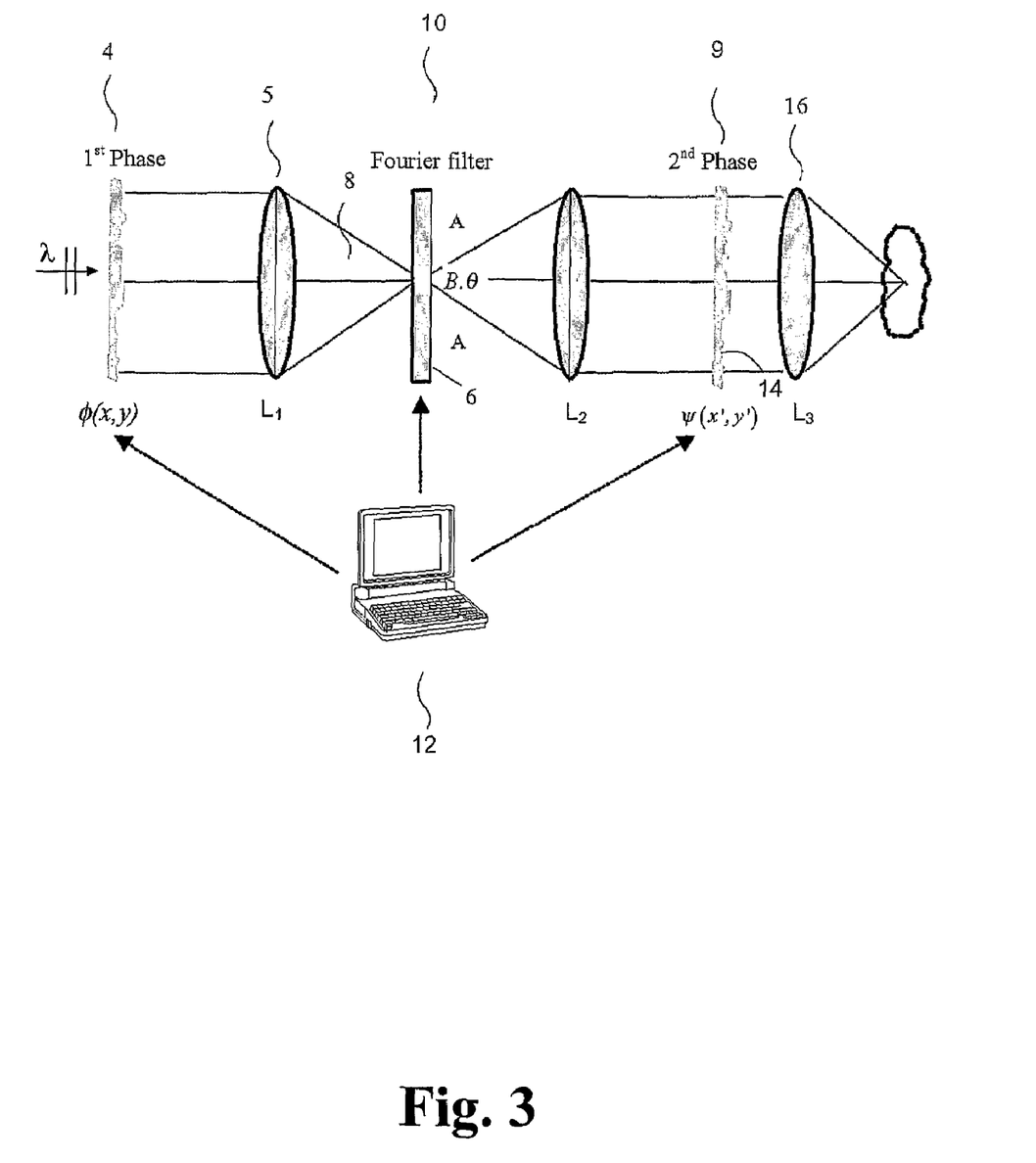
FIG. 3 illustrates schematically an embodiment of the present invention generating the desired three-dimensional field by focusing of $o(x', y')e^{i\psi(x',y')}$.
Figure 4:
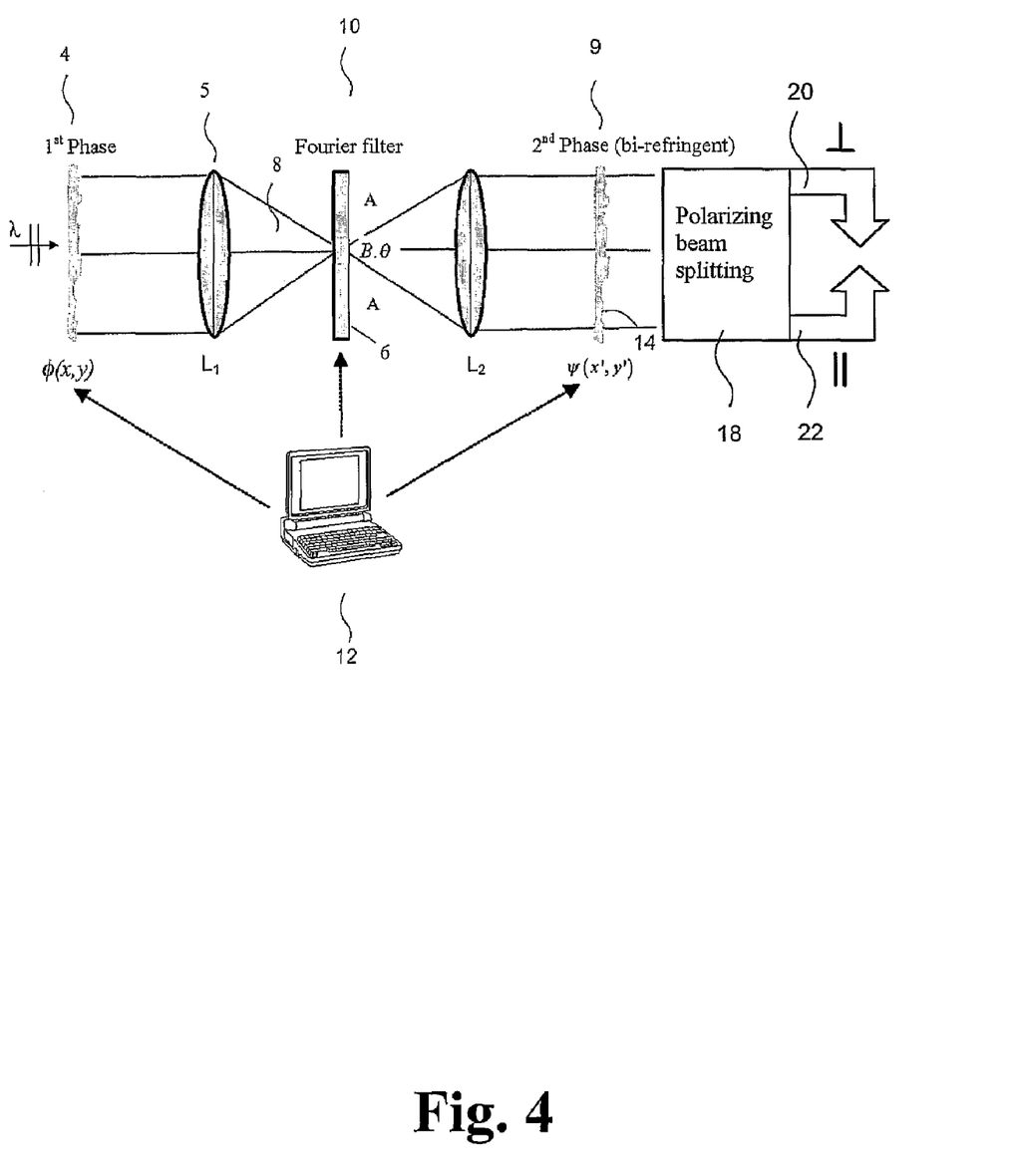
FIG. 4 illustrates schematically an embodiment with a birefringent spatial light modulator.

FIGS. 2, 3 and 4 illustrate schematically an embodiment 10 of the present invention, comprising a 4f CPI phase contrast imaging configuration as illustrated in FIG. 1. Corresponding parts in the figures are designated with identical reference numerals. It is obvious for the person skilled in the art that the 4f configuration may be substituted by the 2f or 1f configurations disclosed in WO 96/34207. The operation of the 4f CPI phase contrast imaging system is explained with reference to FIG. 1 and is not repeated. Again the electromagnetic field o(x', y') is generated in the back focal plane 9 of the lens L2 in front of the second phase modifying element 14. The first phase modifying element 4 has a plurality of individual resolution elements (x, y), each resolution element (x, y) modulating the phase of electromagnetic radiation incident upon it with a predetermined phasor value $e^{i\phi(x,y)}$. As already disclosed, the phasor values $e^{i\phi(x,y)}$ of the phase modifying element and the phase shift value θ are calculated substantially in accordance with $$o(x',y') \cong A[\exp(i\tilde{\phi})(x',y')) + K|\bar{\alpha}|(BA^{-1}\exp(i\theta)-1)]$$

wherein

A is an optional amplitude modulation of the spatial phase filter outside the zero-order diffraction region, B is an optional amplitude modulation of the spatial phase filter in the zero-order diffraction region, $\bar{\alpha} = |\bar{\alpha}|\exp(i\phi_{\bar{\alpha}})$ is the average of the phasors $e^{i\phi(x,y)}$ of the resolution elements of the phase modifying element, and $\tilde{\phi} = \phi - \phi_{\bar{\alpha}}$, and $K = 1 - J_0(1.22\pi\eta)$, wherein $J_0$ is the zero-order Bessel function, and η relates the radius $R_1$ of the zero-order filtering region to the radius $R_2$ of the main-lobe of the Airy function of the input aperture, $\eta = R_1/R_2 = (0.61)^{-1} \Delta r \Delta f_r$.

For each resolution element (x, y), one phasor value is selected from two phasor values representing a particular grey level.

The computer 12 supplies the selected phasor values $e^{i\phi(x,y)}$ to the respective resolution elements (x, y) of the first phase modifying element 4, and supplies the determined θ value to the spatial phase filter 6.

The second phase modifying element 14 also has a plurality of individual resolution elements (x', y'), each resolution element (x', y') modulating the phase of electromagnetic radiation incident upon it with a predetermined phasor value $e^{i\psi(x',y')}$. The computer 12 supplies determined phasor values $e^{i\psi(x',y')}$ to respective resolution elements (x', y') of the second phase modifying element 14 for modulation of the phase of the electromagnetic field o(x', y') incident upon it with the respective phasor value $e^{i\psi(x',y')}$ for generation of the desired output field $o(x', y')e^{i\psi(x',y')}$ emitted from the second phase modifying element 14.

Thus, any desired amplitude as a function of (x', y') and any desired phase as a function of (x', y') of the output field $o(x', y')e^{i\psi(x',y')}$ may be synthesized by the method and apparatus according to the present invention.

The output field $o(x', y')e^{i\psi(x',y')}$ propagates and generates the desired three-dimensional field u(x", y", z"), i.e. the light is re-distributed into an arbitrary three-dimensional field distribution within a selected volume. A simplified scalar description of this complex wave propagation into a three-dimensional field distribution can be obtained by use of a simple plane wave Fourier decomposition:

$$u(x'',y'',z'') \cong \iint \Im(o(x',y')e^{i\psi(x',y')})e^{-i2\pi(f_xx''+f_yx'')} e^{-i2\pi(\lambda^{-2}-f_y^2)z''} df_x df_y$$

where $\Im$ is the Fourier transformation of the controllable complex field $o(x', y')e^{i\psi(x',y')}$ leaving the second phase modifying element 14.

A further optical system, such as a lens 16, a microscope objective lens, a curved mirror, an aspheric lens, etc, may focus the electromagnetic field $o(x',y')e^{i\psi(x',y')}$ within the selected volume. Any subsequent focusing optics can be included in the Fourier decomposition of the above equation.

Further, the computer 12 may comprise light control means for controlling the power of the light-emitting source generating the field incident on the first phase modifying element 4. The computer may also comprise input means, such as a keyboard, a mouse, a 3D mouse, 3D virtual reality equipment, a diskette drive, a USB interface, an optical disc drive, a network interface, a modem, etc, for receiving a three-dimensional field to be synthesized by the system 10. From the received three-dimensional field, the computer may be adapted to calculate phasor values $e^{i\phi(x,y)}$ and $e^{i\psi(x',y')}$ to be transmitted to the respective resolution elements (x, y) and (x', y') of the first and second phase modifying element 4, 14, and the phase shift θ of the spatial phase filter 6 for transmission to the spatial phase filter 6 in accordance with the above-mentioned equations.

In the embodiment shown schematically in FIG. 4, the second phase modifying element 14 is a birefringent spatial light modulator, such as a spatial light modulator based on liquid crystal technology, that is capable of phase modulation by first phasor values for a first polarization of the incident electromagnetic field and second phasor values for a second orthogonal polarization of the incident electromagnetic field, i.e. individual phase modulation of orthogonal polarizations of the incident electromagnetic field is performed. The beam splitter 18 splits the electromagnetic field into two orthogonal and non-interfering polarisation components 20, 22 and relay optics directs the components 20, 22 into a counter-propagating geometry.

Proposed Applications 3D optical micro- and nanomanipulation in real-time.

3D optical multi-beam tweezing for manipulation of micro-objects, such as micro-components, biological cells, etc, using electromagnetic gradient forces proportional to the optical intensity pointing in the direction of the intensity gradient.

Optical fractionation, sorting, sifting etc.

Efficient and dynamic spot-array generators to provide bias or holding beams for 3D arrays of photonic elements, such as bistable elements, photonic switches and smart pixels.

Generation of structured light for machine vision applications. E.g. periodic and skew periodic mesh grid illumination in 3D that can be updated in parallel.

Photolithographic applications (laser 3D direct writing in parallel without the need for sequential scanning). E.g. high power laser direct writing of waveguides in Ge-doped silica.

Volume light intensity modulation in general by use of pure phase modulation (radiation focusators).

3D laser beam shaping in real time.

3D image projection without the need for a laser-scanning device.

Dynamic Infrared Scene Projection (DIRSP).

Exposure device for grating and mask production.

LIDAR applications.

Laser printing in parallel.

Laser show applications.

Atmosphere research.

The invention claimed is:

1. A phase contrast system for synthesizing a desired output electromagnetic field u(x", y", z"), comprising:
a first phase modifying element for phase modulation of an input electromagnetic field by phasor values $e^{i\phi(x,y)}$,
first Fourier or Fresnel optics, for Fourier or Fresnel transforming the phase modulated electromagnetic field, positioned in a propagation path of the phase modulated electromagnetic field,
a spatial filter for filtering the Fourier or Fresnel transformed electromagnetic field by,
in a region of spatial frequencies comprising DC in a Fourier or Fresnel plane,
phase shifting with a predetermined phase shift value θ the Fourier or Fresnel transformed electromagnetic field in relation to a remaining part of the Fourier or Fresnel transformed electromagnetic field, and
multiplying an amplitude of the phase shifted transformed electromagnetic field with a constant B, and
in a region of remaining spatial frequencies in the Fourier or Fresnel plane,
multiplying an amplitude of the Fourier or Fresnel transformed electromagnetic field with a constant A,
second Fourier or Fresnel optics, for forming an electromagnetic field o(x', y') by Fourier or Fresnel transforming the filtered electromagnetic field, and
a second phase modifying element for phase modulating the electromagnetic field o(x', y') into an electromagnetic field $o(x', y')e^{i\Psi(x', y')}$ propagating as the desired output electromagnetic field u(x", y", z").

2. A phase contrast system according to claim 1, wherein at least one of the first and second phase modifying elements is further adapted for phase modulation by first phasor values for a first polarization of the input electromagnetic field and second phasor values for a second orthogonal polarization of the input electromagnetic field.

3. A phase contrast system according to claim 2, wherein the second phase modifying element is adapted for phase modulation by the first phasor values $e^{i\Psi 1(x',y')}$ for the first polarization and the second phasor values $e^{i\Psi 2(x',y')}$ for the second orthogonaF polarization of the input electromagnetic field.

4. A phase contrast system according to claim 2, further comprising an element for directing the phase modulated first polarization of the input electromagnetic field and the second orthoaonal polarization of the input electromagnetic field into separate paths of propagation, to be applied in a non-interfering counter-propagating geometry.

5. A phase contrast system according to claim 1, wherein
A=1.

6. A phase contrast system according to claim 1, wherein
B=1.

7. A phase contrast system according to claim 1, wherein
θ=π.

8. A phase contrast system according to claim 1, wherein the phasor values $e^{i\phi(x,y)}$ of the first phase modifying element and the phase shift value θ substantially fulfil that $o(x',y') \approx A[\exp(i\tilde{\phi}(x',y')) + K|\bar{\alpha}|(BA^{-1}\exp(i\theta)-1)]$ wherein
A is an optional amplitude modulation of the spatial filter outside a zero-order diffraction region,
B is an optional amplitude modulation of the spatial filter in the zero-order diffraction region, $\bar{\alpha}=|\bar{\alpha}|\exp(i\phi_{\bar{\alpha}})$ is an average of the phasor values $e^{i\phi(x,y)}$ of resolution elements of the first phase modifying element, and $\tilde{\phi}=\phi-\phi_{\bar{\alpha}}$, and $K=1-J_0(1.22\pi\eta)$, wherein $J_0$ is a zero-order Bessel function and
η relates a radius $R_1$ of the zero-order diffraction region to a radius $R_2$ of a main-lobe of an Airy function of an input aperture of the first phase modifying element, $\eta=R_1/R_2=(0.61)^{-1}\Delta r\Delta f_r$, wherein Δr is a radius of the input aperture of the first phase modifying element and $\Delta f_r$ is a spatial frequency range of the zero-order diffraction region.

9. A phase contrast system according to claim 8, wherein the phase shift value θ substantially fulfills the equation $$K|\bar{\alpha}| = \frac{1}{2|\sin\theta/2|}.$$

10. A phase contrast system according to claim 1, wherein at least one of the first and second phase modifying elements comprises a complex spatial electromagnetic field modulator that is positioned in a path of the input electromagnetic field and comprises modulator resolution elements $(x_m, y_m)$, each of the modulator resolution elements $(x_m, y_m)$ modulating a phase and an amplitude of the electromagnetic field incident thereon with a predetermined complex value $a_m(x_m, y_m)e^{i\phi(xm, ym)}$.

11. A phase contrast system according to claim 1, further comprising a light source for emission of the input electromagnetic field, the light source comprising a laser array, such as a VCSEL array.

12. An optical micro-manipulation or multi-beam optical tweezer system including the phase contrast system of claim 1.

13. A laser machining tool including the phase contrast system of claim 1.

14. A method of synthesizing a desired output electromagnetic field u(x", y", z"), comprising:
phase modulating an input electromagnetic field by phasor values $e^{i\phi(x,y)}$, Fourier or Fresnel transforming the phase modulated electromagnetic field, filtering the Fourier or Fresnel transformed electromagnetic field by,
in a region of spatial frequencies comprising DC in a Fourier or Fresnel plane,
phase shifting with a predetermined phase shift value θ the Fourier or Fresnel transformed electromagnetic field in relation to a remaining part of the Fourier or Fresnel transformed electromagnetic field, and
multiplying an amplitude of the phase shifted transformed electromagnetic field with a constant B, and
in a region of remaining spatial frequencies in the Fourier or Fresnel plane,
multiplying an amplitude of the Fourier or Fresnel transformed electromagnetic field with a constant A,
forming an electromagnetic field o(x', y') by Fourier or Fresnel transforming the filtered electromagnetic field, and
phase modulating the electromagnetic field o(x', y') into an electromagnetic field $o(x', y')e^{i\Psi(x',y')}$ propagating as the desired output electromagnetic field u(x", y", z").

15. A method according to claim 14, further comprising:

dividing the electromagnetic field o(x',y') into pixels in accordance with disposition of resolution elements (x, y) of a first phase modifying element having a plurality of individual resolution elements (x, y), each resolution element (x, y) modulating a phase of electromagnetic radiation incident thereon with a predetermined phasor value $e^{i\phi(x,y)}$, calculating the phasor values $e^{i\phi(x,y)}$ of the first phase modifying element and the predetermined phase shift value $\theta$ substantially in accordance with $$o(x',y') \cong A[\exp(i\tilde{\phi}(x',y')) + K|\overline{\alpha}|(BA^{-1}\exp(i\theta) - 1)]$$

wherein

A is an optional amplitude modulation of a spatial filter used in said filtering and outside a zero-order diffraction region, B is an optional amplitude modulation of the spatial filter in the zero-order diffraction region, $\overline{\alpha} = |\overline{\alpha}|\exp(i\phi_{\overline{\alpha}})$ is an average of the phasor values $e^{i\phi(x,y)}$ of the resolution elements of the first phase modifying element, and $\tilde{\phi} = \phi - \phi_{\overline{\alpha}}$, and $K = 1 - J_0(1.22\pi\eta)$, wherein $J_0$ is a zero-order Bessel function, and $\eta$ relates a radius $R_1$ of the zero-order diffraction region to a radius $R_2$ of a main-lobe of an Airy function of an input aperture of the first phase modifying element, $\eta = R_1/R_2 = (0.61)^{-1}\Delta r \Delta f_r$, wherein $\Delta r$ is a radius of the input aperture of the first phase modifying element and $\Delta f_r$ is a spatial frequency range of the zero-order diffraction region, selecting, for each resolution element, one of two phasor values which represent a particular grey level, and supplying the selected phasor values $e^{i\phi(x,y)}$ to the respective resolution elements (x, y) of the first phase modifying element, and supplying selected phasor values $e^{i\Psi(x', y')}$ to respective resolution elements (x', y') of a second phase modifying element having a plurality of individual resolution elements (x', y'), each resolution element (x', y') modulating a phase of electromagnetic radiation incident thereon with the respective phasor values $e^{i\Psi(x',y')}$ for generation of the electromagnetic field o(x', y') $e^{i\Psi(x',y')}$.

* * * * *